United States Patent [11] 3,626,368

[72] Inventor Hsing Chu Lee
219 W. 106th St., New York, N.Y. 10025
[21] Appl. No. 790,811
[22] Filed Jan. 13, 1969
[45] Patented Dec. 7, 1971

[54] CHARACTER-READING APPARATUS INCLUDING IMPROVED CHARACTER SET SENSING STRUCTURE

3 Claims, 18 Drawing Figs.

[52] U.S. Cl. .......... 340/146.3 F, 340/146.3 T, 340/146.3 Z, 340/146.3 S, 250/219 CR, 340/172.5
[51] Int. Cl. .......... G06k 9/12
[50] Field of Search .......... 340/146.3

[56] References Cited

UNITED STATES PATENTS

| | | | |
|---|---|---|---|
| 3,106,699 | 10/1963 | Kamentsky | 340/146.3 |
| 3,177,470 | 4/1965 | Galopin | 340/146.3 |
| 3,192,505 | 6/1965 | Rosenblatt | 340/146.3 |
| 3,275,986 | 9/1966 | Dunn et al. | 340/146.3 |
| 3,295,103 | 12/1966 | Driese et al. | 340/146.3 |
| 3,412,255 | 11/1968 | Krieger | 340/146.3 |

*Primary Examiner*—Maynard R. Wilbur
*Assistant Examiner*—William W. Cochran
*Attorney*—Hopgood and Calimafde

ABSTRACT: A reading machine, including devices to pick up the signals of group identification points for effectively differentiating configurations, is designed for use independently or in conjunction with a coordinate point selection apparatus. A coordinate matrix of photocells, the number and size of which are dependent upon the type of configurations to be analyzed scan each configuration recording for each the presence and absence of writing in the area viewed by each of the cells in a coordinate system. The number of "written" areas are then added numerically on a coordinate basis for all of the letter configurations. A combinatorial constant $n$, where $2^n$ equals the total number of letter configurations, is derived and dictates the use of a specific stored combination chart. All those coordinate points have the totals 1 to $n-1$ (where $n$ is the number of configurations) are separately stored and compared intra se to select those within each group which are unique. A selective choice is then made of predetermined groups to obtain a combination of unique subgroups equal to $n$. This is the group identification pattern or set of points unique to the particular number and type of configurations sought to be recognized.

INVENTOR.
HSING CHU LEE

BY

Hopgood & Calimafde
ATTORNEYS

INVENTOR.
HSING CHU LEE
BY
Hopgood & Calimafde
ATTORNEYS

INVENTOR.
HSING CHU LEE
BY
Hopgood & Calimafde
ATTORNEYS

INVENTOR.
HSING CHU LEE
BY
Hopgood & Calimafde
ATTORNEYS

INVENTOR.
HSING CHU LEE
BY
Hopgood & Calimafde
ATTORNEYS

CHARACTER-READING APPARATUS INCLUDING IMPROVED CHARACTER SET SENSING STRUCTURE

BACKGROUND OF THE INVENTION

This invention relates to character-reading machines generally, and, in particular, to a method for automatically deriving an identification format or set for the particular configuration of letters, figures, etc., under consideration.

The reading machine art has now become well developed to the point where a great number of systems exist for the identification of written and printed characters (generally referred to hereinafter as "configurations" to embrace under one genus all possible written and printed species). The machines function in a wide variety of operating modes depending upon the particular font being recognized and the flexibility and versatility of the machine.

Some common types of apparatus include mechanisms which spot scan, line scan, or area scan. Functionally, there are mechanisms which compare read data against stored data, mechanisms which use masking techniques, mechanisms which employ Boolean logic, and so on.

Regardless of what type of arrangement is used, in order to build in greater flexibility and versatility, conventional devices tend to be extremely sophisticated in circuitry and expensive to build and maintain. To give an example, where a great variety of fonts or configurations are to be analyzed, conventional arrangements may include a whole mosaic of photocells in conjunction with sophisticated logic or masking circuitry which must be programmed in great detail in order to analyze the configurations under consideration.

Accordingly, it is the object of this invention to provide an accurate and low-cost recognition machine for written and printed characters.

It is a further object of this invention to provide a group identification method and apparatus for automatically determining the simplest and most efficient identification set or read-head format for a particular family of configurations.

It is a further object of this invention to provide a method of the foregoing type easily employed directly with reading machines, i.e., which speaks a common machine language and is therefore adaptable to direct adjunct use.

It is a further object of this invention to provide a method and apparatus according to the foregoing object which is extremely versatile and which is adaptable to most configurations, including letters, figures, etc.

Briefly, the invention is predicated upon a method and apparatus for storing, in a coordinate system, each of the particular configurations in the family under consideration, and then comparing the configurations intra se, mathematically, to determine the minimum number or most efficient group identification points (group identification set) which will uniquely recognize each of the configurations in the family, and recognition machines to read the sets.

The above-mentioned and other features and objects of this invention and the manner of attaining them will become more apparent and the invention itself will best be understood by reference to the following description of embodiments of the invention taken in conjunction with the accompanying drawings, the description of which follows, wherein FIG. 1 is a block schematic diagram of one embodiment of the invention;

FIGS. 2*a*–2*d*, including 2*c*′, illustrate four machines designed to automatically read configurations;

FIGS. 3–6, including 4*a*, illustrate graphically the progression of steps according to the inventive method;

FIGS. 7*a*–7*d* illustrate some possible combinations of three sets;

DETAILED DESCRIPTION OF THE INVENTION

The invention shall now be described in detail, first with respect to its method, and then with respect to a specific apparatus for accomplishing the foregoing method, and then with respect to machines for utilizing the identification points derived by the method.

The description which follows is directed at the procurement of a set or group of identification points, these points defining such mutual differences between the letter characters (the configurations chosen) such that the identity of each character may be unambiguously determined.

Consider, for example, three sets, A, B and C (including the possibility of zero, it is four). They may intersect several different ways, as FIGS. 7*a*–7*d* show. Dividing the whole area into *a*, *b*, *c*, *ab*, *ac*, *bc*, and *abc* and *n*: Set A (similarly is the case with the sets B and C) in FIG. 7*a* has a nonoccupancy of areas *b*, *bc*, and *c*. Thus, two or three points may be chosen from particular areas in order to identify the sets (no more than one point being chosen for the same area) and the group identification is as follows:

TABLE I

| | 2 spots | | | | | | | | | 3 spots | | | | | |
|---|---|---|---|---|---|---|---|---|---|---|---|---|---|---|---|
| | *ab* | *ac:* | *ab* | *bc:* | *ac* | *bc:* | *a* | *b* | *c:* | *a* | *ab* | *ac:* | *ab* | *ac* | *bc* |
| A | X | X | X | — | X | — | X | — | — | X | X | X | X | X | — |
| B | X | — | X | X | — | X | — | X | — | — | X | — | X | — | X |
| C | — | X | — | X | X | X | — | — | X | — | — | X | — | X | X |

A point can be chosen from each area (total seven points) without simplification to also serve the identification purpose as follows:

TABLE II

| | *a* | *b* | *c* | *ab* | *ac* | *bc* | *abc* |
|---|---|---|---|---|---|---|---|
| A | X | — | — | X | X | — | X |
| B | — | X | — | X | — | X | X |
| C | — | — | X | — | X | X | X |

For identification purposes, it is obviously irrelevant to choose a point from *abc* since this area is the intersection of the three sets and has no identification value. If the three sets intersect as in FIG. 7*b*, the only choice is *ab*and *bc* (two points). If, on the other hand, the sets intersect as in FIGS. 7*c* and 7*d*, at least three points are necessary. From FIG. 7*d*, it is apparent that the choice is one from each set.

Figures 3, 4, 4A, 8:
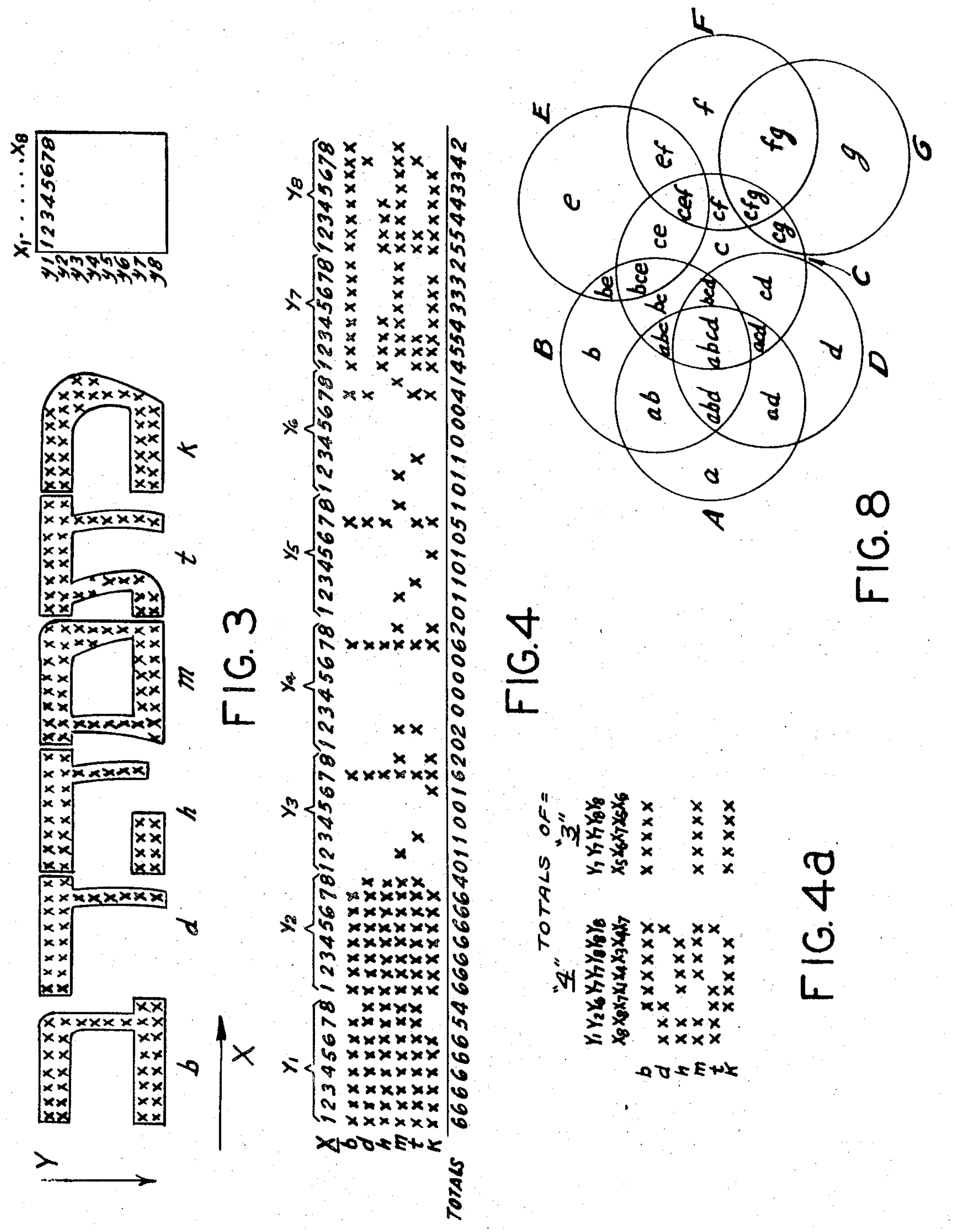
FIG. 8 illustrates one possible combination for eight sets.

Consider, for example, eight sets as in FIG. 8. The areas of intersection and nonintersection are *a*, *ab*, *abc* ...*g*. There is a mathematically necessary number of points or spots in order to identify the set. Simply expressed, this number may be represented by $n$ where $2^n \geq$ the number of sets (in the foregoing the number of sets is equivalent and used interchangeably with the number of configurations or letters).

Assuming the eight sets break down as shown in FIG. 8, several identification points (which make up one identification set) may be chosen in order to unambiguously identify the character sets. For example, table III shows some of the combinations which may be chosen assuming four identification points.

TABLE III

| | ab | bcd | cef | fg | ad | bcd | cef | fg | ab | bcd | cef | ceg |
|---|---|---|---|---|---|---|---|---|---|---|---|---|
| A | X | | | | X | | | | X | | | |
| B | X | X | | | | X | | | X | X | | |
| C | | X | X | | | X | X | | | X | X | X |
| D | | X | | | X | X | | | | X | | |
| E | | | X | | | | X | | | | X | X |
| F | | | X | X | | | X | X | | | X | |
| G | | | | X | | | | X | | | | X |
| None | | | | | | | | | | | | |

It is to be understood that the number of points of identification may be increased for the best choice or to agree with the machine language. Accordingly, five points shown in table IV may be chosen to identify the character sets. Even more spots can be derived where desired.

TABLE IV

| | ab | abcd | bce | ef | g | ad | bcd | ce | f | g |
|---|---|---|---|---|---|---|---|---|---|---|
| A | X | X | | | | X | | | | |
| B | X | X | X | | | | X | | | |
| C | | X | X | | | | X | X | | |
| D | | X | | | | X | X | | | |
| E | | | X | X | | | | X | | |
| F | | | | X | | | | | X | |
| G | | | | | X | | | | | X |
| None | | | | | | | | | | |

Generally, the number of identification points derived from the analysis in order to identify all of the individual configurations varies depending upon: (a) the number of configurations to be recognized; (b) the style of the configurations; and (c) the size of the spots. It will be appreciated that one purpose of the invention is to minimize the number of identification points to thus economize the associated circuitry in the reading machine.

The shape and size of the points depend upon the pickup devices. For the purposes of this disclosure, it will be understood that any type pickup may be used, including most of the variety of scan devices available on the market. The smaller the identification spot may be, the smaller may be the number of identification points that are necessary and the greater the number of possible groups to unambiguously determine the character, thus making available cross-check groups for error identification. In any case, the particular group chosen will depend upon any number of factors involving cost, placement of cells, closeness, the machine languages, etc. Additional spots may be added without affecting the operation. These additional spots may be utilized for guiding the operation of the machine, the spacing, return device, editing, etc. Since these spots are not for recognition purposes, they will not be discussed further.

There is, however, a minimum number of points which depend upon the number of characters to be analyzed. This number is $n$ where $2^n \geq$ the number of characters.

TABLE V.—COMBINATORIAL CHARTS

| | 2 spots | | 3 spots | | | 4 spots | | | | 5 spots |
|---|---|---|---|---|---|---|---|---|---|---|
| 1 | | | | | | | | | | · · · · · |
| 2 | X | | X | | | X | | | | |
| 3 | | X | | X | | | X | | | |
| 4 | X | X | | | X | | | X | | |
| 5 | | | X | X | | | | | X | |
| 6 | | | X | | X | X | X | | | |
| 7 | | | | X | X | X | | X | | |
| 8 | | | X | X | X | X | | | X | |
| 9 | | | | | | | X | X | | |
| 10 | | | | | | | X | | X | |
| 11 | | | | | | | | X | X | |
| 12 | | | | | | X | X | X | | |
| 13 | | | | | | X | X | | X | |
| 14 | | | | | | | X | X | X | |
| 15 | | | | | | X | X | X | X | |
| 16 | | | | | | Y | X | X | X | |

The number $n$ can then be employed to determine a specific combinatorial chart delineating the possible permutations and combinations. Table V illustrates the charts for, respectively, two, three and four points. For example, if four characters were to be analyzed (including the blank it would be five), at least a three spot chart would be necessary. Included then in the available combinations would be the top five lines where the sum is 1, 2, 2; lines 3 to 6 where the sum is 2, 2, 2; or lines 5 through 8, where the sum is 3, 3, 3.

In order to clarify the invention still further, an operative example will now be described in which six Hebrew letters (FIG. 3) will be operated upon in order to automatically choose a group identification set for unambiguously identifying the character. For simplicity of reading, underneath each Hebrew character is a rough English equivalent for discussion purposes.

The following apparatus to be described is computer in type, and while the computer stages and the relationships between them are specifically shown and described in block format, and an analytical analysis of each of the stages is also set forth in detail, it will be appreciated by those skilled in the art that a description of the details of the computer components would only encumber this description, and the selection of such devices is purely mechanical.

Figure 1:
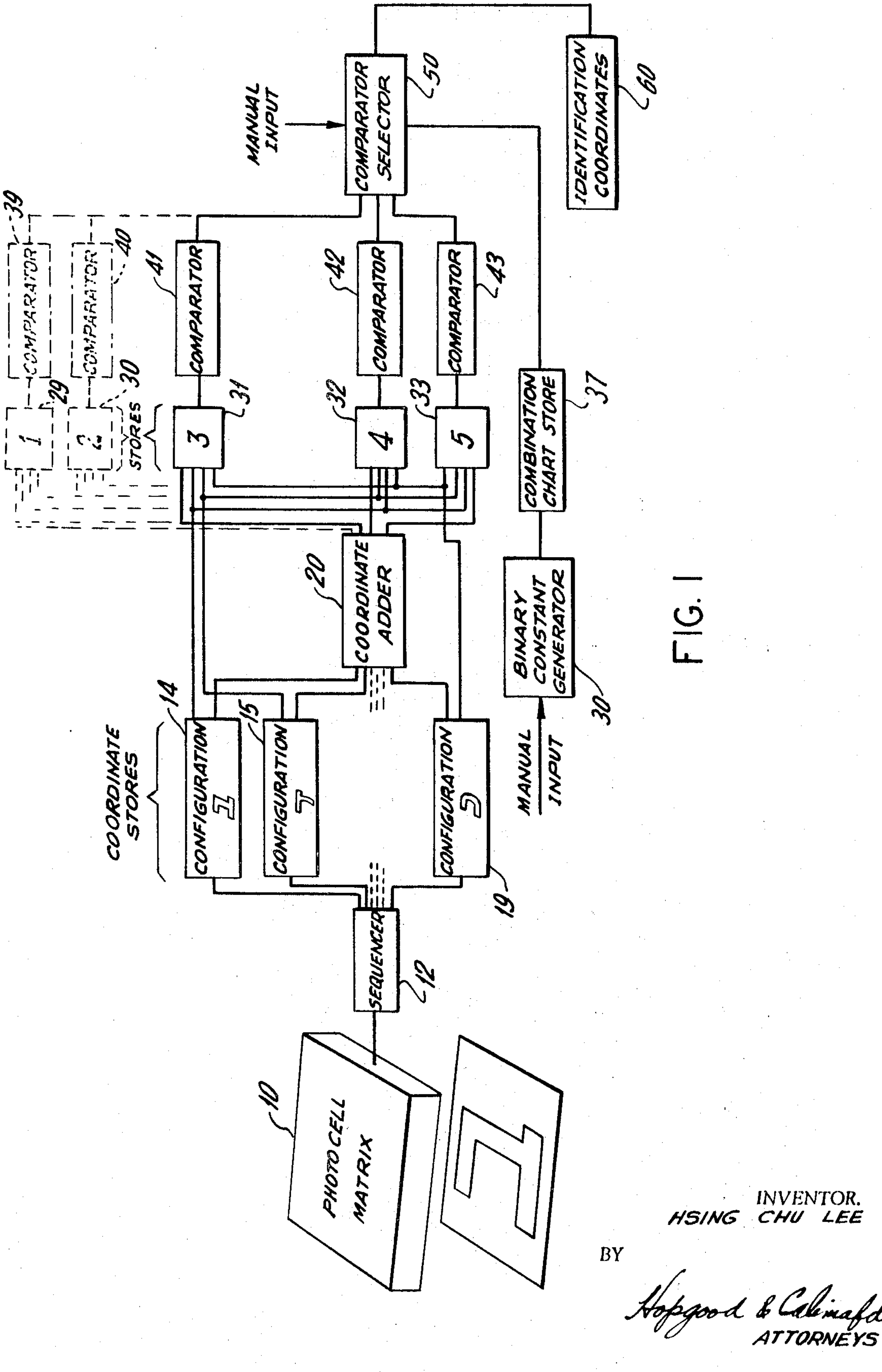

In accordance with the invention, each of the Hebrew characters is sequentially scanned by a light-sensitive photocell matrix 10 as shown in FIG. 1. The photocell matrix is made up of a coordinate array of photocells, the number and size of which are selected dependent upon the complexity of the characters and the capacity of the cells involved.

The output of the photocell matrix 10 is fed via a sequencer 12, which may operate manually or automatically with the advancement of the respective Hebrew characters to coordinate stores 14 through 19 (additional coordinate stores are, of course, necessary for larger size character sets; however, they will not be needed for this example). Each coordinate store can include, for example, a matrix of ferrite cores equivalent in number and position to the photocells. The cells are referenced to the cores on a one to one basis with "writing-in" dependent upon the presence or absence of a written area at that coordinate. Threshold devices may be employed to selectively include or exclude partial strokes within cell areas.

Coordinate stores 14 through 19 are coupled to coordinate adder 20 which accumulates the totals shown in FIG. 4. Thus, for example, in the 8×8 matrix shown, 64 separate totals will be accumulated in the coordinate adder 20, the resultant accumulations each representing the sum of the characters at the 64 coordinate points.

A binary constant generator 30 generates a constant $n$ where $n$ is derived from the equation $2^n \geq$ the number of characters. The number of characters in this case is 6 and $n$ equals 3. Accordingly, the three-spot combination chart would be selected by store 37.

Stores 29, 30...33...are provided, in each of which is stored information of the coordinate having the corresponding sum (i.e., 1, 2, 3...$p$); where $p$ is the maximum necessary sum. As is shown in the figure, the stores 29, 30...33...are coupled to the configuration stores 14 through 19 in order to also provide memorization of the particular configuration which has written areas at the coordinate value. More specifically, and are made clear from figures 1, 3, 4 and 4$a$, the stores 29–37, e.g., the store 31 contains the identity of all coordinate sensing points (defined by an X- and a Y-coordinate) which sense a total of exactly three marked areas in the character set and, moreover, an ordering by each character of the character set indicating whether or not printed matter in that character contributes to the associated sum. Thus, for example, each of the coordinate sets $Y_7$, $X_5$;...; $Y_8$, $X_6$ each sense printed matter in three characters of the assumed six-character set, wherein the Hebrew letters identified by the English letters $b$, $m$ and $k$ contribute to the sum while the characters identified by the letters *d*, *h* and *t* do not so contribute. The pattern stored in the store 32 associated with the sum 4 is shown in the left portion of FIG. 4*a* wherein the same type of information is presented. FIG. 4*a* illustrates the contents of stores 31 and 32. The contents of other stores may be similarly arrived at from the data given in FIG. 4.

Coupled to each of the stores 29, 30...33...are comparators 39, 40...43..., respectively, which act to compare information within any store intra se. This comparison effects the information shown in FIG. 4*a* wherein a determination is made of which information is duplicate. Thus, for example, as may be seen from FIG. 4*a* all of the "sum equals 3" set information is redundant and hence, only one may be used as a representative for further processing. Comparator 41 will present one coordinate printed matter detection pattern for the character set for further processing.

In this example, we have chosen sum 3 as the beginning upon the premise that sums 1 and 2 (29 and 30) have been either manually withdrawn or have been found ineffective by the apparatus.

Figure 5:
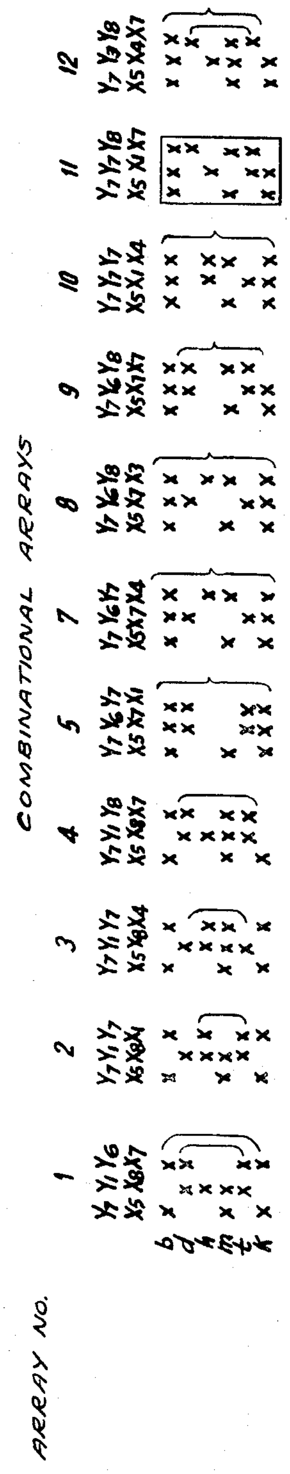

Comparator selector 50 combines first the lowest store identification sum (3) to see whether in fact three mutually distinct points exist to unambiguously identify the characters. Since in this case it does not, the comparator selector now chooses the points available from the sum (4) store (again, only the nonduplicative points thereof) and these are staged with the sum (3) information in all possible permutations and combinations as shown in FIG. 5.

As will be appreciated, the introduction of a comparison between sum-3 and sum-4 inter se produces other combinations in which ambiguous readings may be effected. Thus, for example, in the first grouping in FIG. 5, *d* and *t* would be ambiguously determined. Comparator selector 50, therefore, chooses one grouping (for example, group 11, sum 3, 4, 4) of identification points or one identification set for unambiguously identifying the characters.

Figure 6:
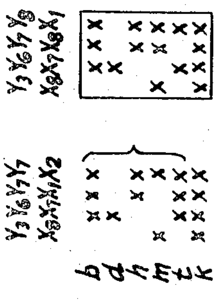
Figure 7A:
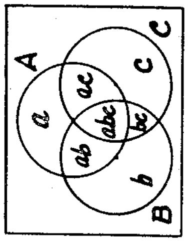
Figure 7B:
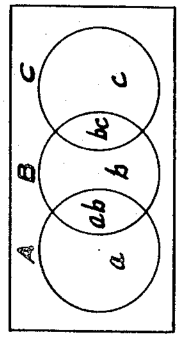
Figure 7C:
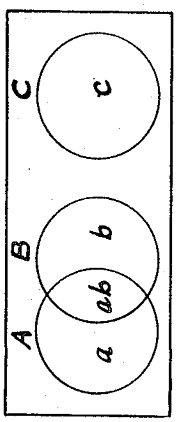
Figure 7D:
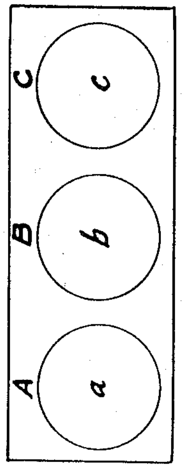

FIG. 6 illustrates the example in which four identification spots are chosen to identify the letters. This choice could obtain, for example, when none of the combinations of FIG. 5 effect the desired result, or for other design purposes. In this case, a manual input to the selector 50 could be triggered in order to effect the new selection logic as shown in FIG. 6. Alternatively, the apparatus could merely be programmed to add one to the combination store and repeat the sequence.

Figure 2A:
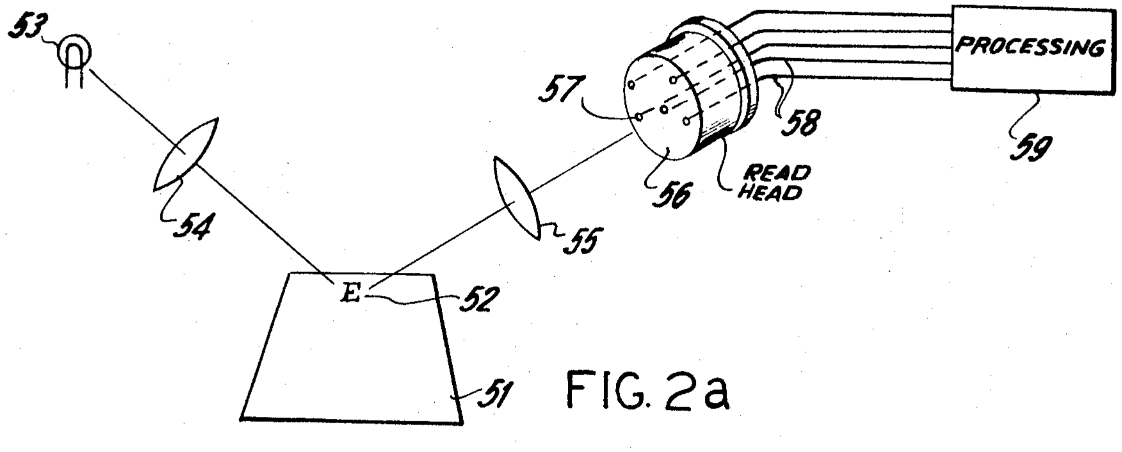

Output device 60, which may be any type computer readout visually indicates the coordinates of the identification spots. Reading devices may now be manufactured specifically (as shown in FIG. 2*a*) for the six Hebrew letters. The reading machines will be described hereinafter.

Figure 9:
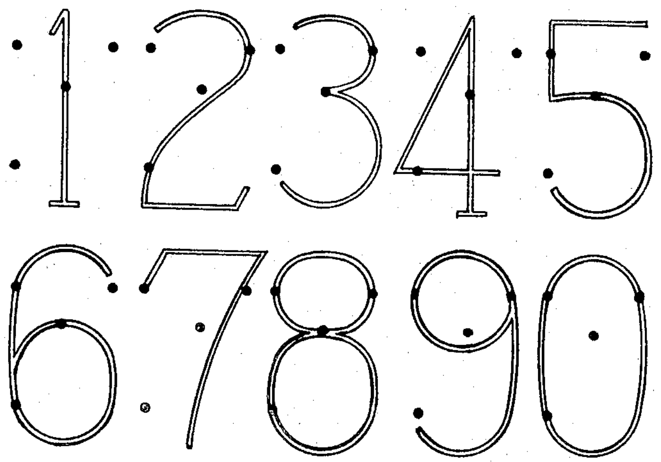
FIGS. 9 and 10 show identification sets for numerals and letters of one type font, respectively.
Figure 10:
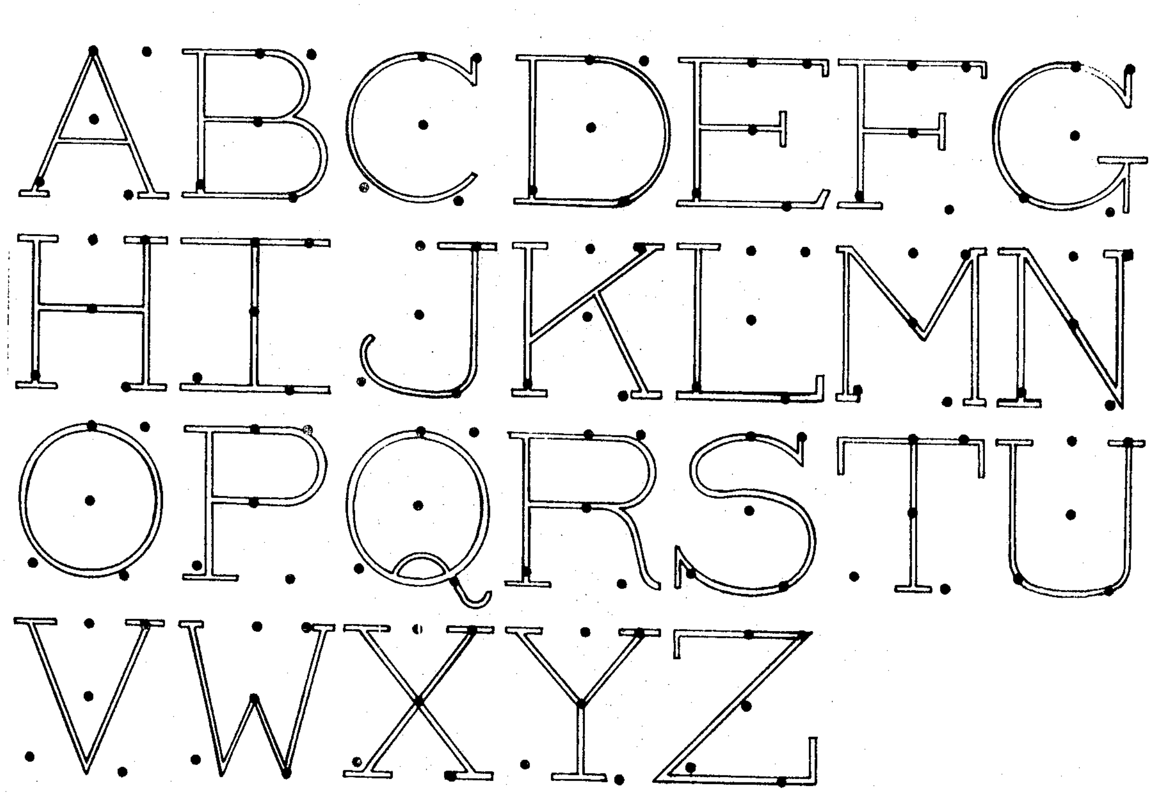

FIGS. 9 and 10 illustrate the result of the application of the process to a specific type font for numerals and English letters, respectively.

FIGS. 2*a* through 2*d* are schematic illustrations of reading machines and components which may be employed in conjunction with the above apparatus or independently to pick up the signals of the spots.

In FIG. 2*a*, a light source 53 illuminates a mat 51 via a lens 54. The letter to be read 52 is disposed on the document and the document moved by conventional means (not shown) to cause either a scanning of the letter or to effect the positioning of the letter within the field of view of the read-head 56. Lens 55 focuses the image of the particular letter under consideration upon the read-head which comprises a group of photosensitive cells 57 which are led by wires 58 to box 59 for further processing. In the example shown, five photocells are arranged according to the identification points (assuming a five-spot combination chart is employed). The photocells are normally conductive and the projective image of the pattern being read will render the cells nonconductive or lower the voltage in a conventional manner below some predetermined threshold. The output of the cells will thus be binary signals which may then be lead through conventional logic circuitry which has been greatly simplified by the reduced number of photocells (by virtue of the invention).

It is understood that more cells may be employed to read the configurations by line or by page.

Figure 2B:
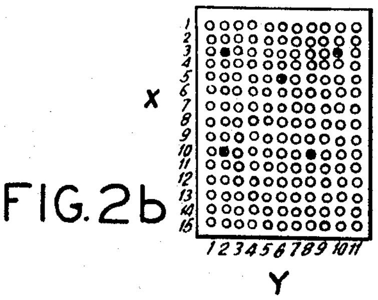

FIG. 2*b* shows a multipurpose read-head which includes a mosaic of 11×15 photocells. Each photocell is isolated and connected with an independent output lead. When the identification points have been derived, those cells are rendered operative which correspond with the identification points derived by the inventive method. Alternatively, a mask or other method may be employed to inactivate other photocells such that only those cells which correspond to the identification spots are rendered effective.

Figure 2C:
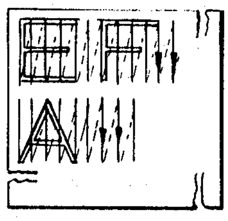
Figure 2C:
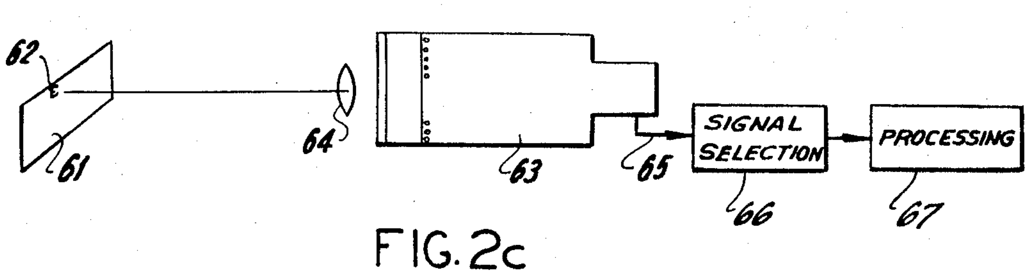

FIG. 2*c* shows another conventional arrangement. In this figure, the identification spots are picked out in a successive manner by apparatus such as a flying spot scanner, cathode ray tube cameras with photoemissive mosaics, fiber optics, or tiny diodes. The pattern to be recognized 62 is printed upon the mat 61 which is transmitted to the signal pickup camera 63 via lens 64. FIG. 2*c'* is a detail of the spot scan. The signal output is available over line 65 and transmitted to stage 66 which is a selection stage wherein all the unnecessary currents are excluded and only those carrying information of the identification spots are selected. As will be appreciated by those skilled in the art, this greatly reduces the necessary bandwidth. Further processing takes place in a conventional manner via stage 67.

Figure 2D:
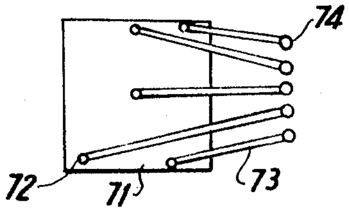

With a flying spot scanner, it is necessary to pick up a great deal of unnecessary signals. As an alternative, it is possible to use optical fibers to transmit the identification signals into a linear array for scanning. FIG. 2*d* illustrates the method wherein the fibers 73 conduct the light signals between jig 71 and line 74.

While the principles of the invention have been described in connection with specific apparatus, it is to be clearly understood that this description is made only by way of example and not as a limitation to the scope of the invention as set forth in the objects thereof and in the accompanying claims.

Thus, for example, were the configurations magnetically written, then the matrix would consist of magnetic rather than light transducers.

What is claimed is:

1. A process for obtaining group identification positions for a set of character configurations comprising the steps of:

scanning each of the configurations by a coordinate matrix of transducers;

recording the outputs of each transducer for each of said character configurations corresponding to the presence or absence of a written area in each character at each coordinate sampling point;

numerically adding the recorded instances of signals inflicting written area at each corresponding transducer position over said character set and preserving the additive results;

deriving a combinatorial constant *n* comprising the least value of *n* such that $2^n \geq$ the number of character configurations;

deriving combinatorial arrays formed by the character configuration signal pattern of at least *n* transducers, each of said transducers detecting written area in at least *n* configurations; and selecting one of said combinatorial arrays of said transducer positions sufficient for uniquely recognizing each of said characters, said selecting step including examining said combinatorial arrays for duplicative entries therein.

2. Apparatus for obtaining group identification positions for a set of character configurations comprising:

a coordinate matrix of transducers for scanning each of the configurations;

means for recording the outputs of each transducer for each of said character configurations corresponding to the presence or absence of a written area in each character at each coordinate sampling point;

means for numerically adding the recorded instances of signals inflicting written area at each corresponding transducer position over said character set and preserving the additive results;

means for deriving a combinatorial constant $n$ comprising the least value of $n$ such that $2^n \geq$ the number of character configurations;

means for deriving combinatorial arrays formed by the character configuration signal pattern of at least $n$ transducers, each of said transducers detecting written area in at least $n$ configuration; and means for selecting one of said combinatorial arrays of said transducer positions sufficient for uniquely recognizing each of said characters, said selecting means including means for examining said combinatorial arrays for duplicative entries therein.

3. In combination in a reading machine for reading characters of a predetermined character set comprising an array of character configurations, said machine comprising a plurality of operative transducers disposed at selected ones of a coordinate array of character sampling stations for unambiguously identifying each of said character configurations, and means coupled to said transducers for unambiguously identifying each character depending upon the signal pattern provided by said transducers, said transducer stations being selected by scanning each of the configurations by a coordinate matrix of transducers; recording the outputs of each transducer for each of said character configuration corresponding to the presence or absence of a written area in each character at each coordinate sampling point; numerically adding the recorded instances of signals inflicting written area at each corresponding transducer position over said character set and preserving the additive results; deriving a combinatorial constant $n$ comprising the least value of $n$ such that $2^n \geq$ the number of character configurations; deriving combinatorial arrays formed by the character configuration signal pattern of at least $n$ transducers, each of said transducers detecting written area in at least $n$ configurations; and selecting one of said combinatorial arrays of said transducer positions sufficient for uniquely recognizing each of said characters, said selecting step including examining said combinatorial arrays for duplicative entries therein.

* * * * *